Patented July 6, 1954

2,683,176

UNITED STATES PATENT OFFICE 2,683,176

SYNTHESIS OF VITAMIN K₁ USING BORON TRIFLUORIDE CATALYSTS

Otto Isler and Karl Doebel, Basel, Switzerland, assignors to Hoffmann-La Roche Inc., Nutley, N. J., a corporation of New Jersey No Drawing. Application June 20, 1952, Serial No. 294,721

Claims priority, application Switzerland July 17, 1951

5 Claims. (Cl. 260—625)

It is known that 2-methyl-3-phytyl-1,4-naphthohydroquinone (dihydrovitamin K₁) and its derivatives may be produced by condensation of 2-methyl-1,4-naphthohydroquinone with phytol or acetylphytol or phytyl bromide or phytadiene. Thus, in U. S. Patent Specification 2,325,681 the condensation is described of acetylphytol and 2-methyl-1,4-naphthohydroquinone by means of zinc chloride. According to U. S. Patent Specification 2,348,037, phytyl bromide is reacted with the monosodium salt of 2-methyl-1,4-naphthohydroquinone. The U. S. Patent Specification 2,417,919 shows how 2-methyl-1,4-naphthohydroquinone is condensed with phytol or phytadiene at a reaction temperature of 70–180° and for approx. 24 hours, whereby oxalic acid and trichloroacetic acid are used as acid condensing agents. Isophytol and phytyl ethers have as yet not been condensed with 2-methyl-1,4-naphthohydroquinone.

It has now been found that when condensing 2-methyl-1,4-naphthohydroquinone with phytol or isophytol or the derivatives of the latter, the yield may be substantially increased by using boron trifluoride catalysts as acid condensing agents. Whereas hitherto the yields were at best about 29%, the new process yields more than 40%. From an economic angle, this substantial improvement of the yields means a considerable progress, particularly in view of the high costs of the end products and of the phytol component. The condensation with boron trifluoride catalysts requires neither high temperature of reaction nor long duration of reaction. Accordingly, it involves less decomposition of the condensation product during its function. The increase of the yield further facilitates the subsequent purification, because of the more favorable proportion of the condensation product as compared with the side products.

The new process comprises condensing 2-methyl-naphthohydroquinone with phytol or isophytol or derivatives thereof by means of boron trifluoride catalysts. The process may be used especially with phytol, isophytol, phytyl esters, isophytyl esters and phytyl ethers. The temperature of the reaction should preferably be maintained between 30 and 120° C. A particularly suitable manner of performing the invention consists in the use of boron trifluoride etherate as catalyst and in choosing a temperature of between 40 and 70° C. The process is particularly suited for the reaction of 2-methyl-1,4-naphthohydroquinone with isophytol.

Example 1

11 parts by weight of 2-methyl-1,4-naphthohydroquinone, 30 parts by volume of water-free dioxane and 1.5 parts by volume of boron trifluoride etherate are heated to 50° C. While agitating and introducing nitrogen, 10 parts by weight of phytol dissolved in 10 parts by volume of dioxane are added in the course of 15 minutes. Thereupon, the dark colored reaction mixture is stirred for 20 additional minutes at 50° C., cooled down and 60 parts by volume of ether are added. The reaction mixture is washed first with water, then with a mixture of 3 parts of N sodium hydroxide and 2 parts of a 2.5% solution of sodium hydrosulfite and again with water. The aqueous extracts are washed with ether. The ether solutions are collected, dried over sodium sulfate and concentrated, toward the end under reduced pressure.

The wax-like condensation product so obtained is mixed with 60 parts by volume of petroleum ether (boiling limits 30–40° C.) and agitated with hydrogen in the presence of a little active palladium lead catalyst (Pd-CaCO₃ catalyst, the activity of which is reduced by the addition of lead and quinoline). During the operation, the condensation product separates in the form of a voluminous white precipitate. The latter is separated by filtration in the absence of air while adding an inert coarse-grained adsorption agent (for example aluminum silicate salt for filter purposes), and washed with cooled petroleum ether. Thereupon, the 2-methyl-3-phytyl-1,4-naphthohydroquinone is extracted from the filter cake by means of ether; the ethereal solution is concentrated to 100 parts by volume and the reaction product is oxidized by stirring the solution with 6.6 parts by weight of silver oxide during 30 minutes. The solution is filtered through sodium sulfate, the latter is rinsed with ether and the solvent is evaporated. There are obtained 5.7 parts by weight of 2-methyl-3-phytyl-1,4-naphthoquinone (vitamin K₁) in the form of a golden yellow oil of $n_D^{20}=1.527$. The ultraviolet spectrum in petroleum ether solution shows peaks at 243, 249, 261, 270 and 325 mµ

($E_{1\,cm.}^{1\%}$ = 398, 417, 402, 402 and 75)

with respect to phytol, the overall yield is 37.5% of the theoretical one.

Example 2

6 parts by weight of 2-methyl-1,4-naphthohydroquinone are dissolved in 16 parts by volume of acetylglycol monomethyl-ether and 0.8 part by volume of boron trifluoride etherate is added. 3 parts by weight of phytyl acetate (prepared by boiling phytol with acetic anhydride) are added at 50° C., whereupon the mixture is stirred during 20 minutes. The mixture is cooled down, diluted with ether, washed with a mixture of 3 parts of N sodium hydroxide and 2 parts of a 2.5% solution of sodium hydrosulfite and thereafter with water, dried and concentrated. 4.1 parts by weight of a condensation product of $n_D^{20}$=1.514 are obtained.

The said condensation product is esterified by boiling with 40 parts by volume of acetic anhydride in the presence of 4 parts by weight of zinc dust. 4.2 parts by weight of a concentrate containing more than 50% of 2-methyl-3-phytyl-1,4-naphthohydroquinone-diacetate are thus obtained ($n_D^{20}$=1.512; ultraviolet maximum in petroleum ether at 230 mµ:

$$E_{1\,cm.}^{1\%} = 880)$$

The purification of the compound may be effected in the percolation chromatogram on an aluminum oxide column (activity grade 4 according to Brockmann). Phytyl compounds are thus washed first through the column by means of petroleum ether, whereupon the product desired is eluted with benzene. The benzene eluate is concentrated and the residue crystallized in ethanol. The pure 2-methyl-3-phytyl-1,4-naphthohydroquinone-diacetate of melting point 59° C. is thus obtained; this compound is identical with the dihydrovitamin K₁ diacetate from natural sources. The yield of crystals may be improved by repeating the chromatographic purification of the material from the mother liquor. The total yield of pure diacetate is 1.5 parts by weight. Ultraviolet maximum in alcohol at 230 mµ

($E_{1\,cm.}^{1\%}$ = 1600)

and 286 mµ

($E_{1\,cm.}^{1\%}$ = 116)

ultraviolet minimum at 232 mµ

($E_{1\,cm.}^{1\%}$ = 40.3)

With respect to phytyl acetate, the yield of the pure compound is 32%.

Example 3

5 parts by weight of phytyl formate (prepared from phytol and formic acid by means of boron trifluoride etherate; boiling point 145–155°/0.1 mm., $n_D^{20}$=1.459) are added within 10 minutes at 50° C. to a solution of 3 parts by weight of 2-methyl-1,4-naphthohydroquinone and 1 part by volume of boron trifluoride etherate in 15 parts by volume of acetylglycol monomethyl-ether. The mixture is stirred for 20 minutes at 50° C., cooled down and the condensation product formed is purified and acetylated as described in Example 2. There are obtained 6.6 parts by weight of acetylated condensation product of $n_D^{20}$=1.506 showing an ultraviolet maximum at 230 mµ

($E_{1\,cm.}^{1\%}$ = 760)

This acetylated condensation product is transformed as described in Example 2 by means of a percolation chromatogram and crystallisation in ethanol into the pure 2-methyl-3-phytyl-1,4-naphthohydroquinone diacetate of melting point 59° C.

The same ester is obtained in analogous manner by condensation of 2-methyl-1,4-naphthohydroquinone with dichloracetylphytol, which in turn may be prepared from phytol and dichloracetic acid with the aid of boron trifluoride etherate (boiling point 140–150° C./0.2 mm., $n_D^{20}$=1.465).

Example 4

5 parts by weight of phytylmethylether (prepared by boiling phytyl bromide with potassium carbonate in methanol; boiling point 132–135° C./0.01 mm. and $n_D^{20}$=1.457) are dissolved in 5 parts by volume of dioxane, and then added at 50° C. to a solution of 5 parts by weight of 2-methyl-1,4-naphthohydroquinone and 1 part by volume of boron trifluoride etherate in 20 parts by volume of dioxane. The mixture is stirred 1 hour at 50° C., cooled down, and the condensation product obtained is purified and acetylated as described in Example 2. A concentrate containing about 50% of 2-methyl-3-phytyl-1,4-naphthohydroquinone (ultraviolet maximum at 230 mµ:

$$E_{1\,cm.}^{1\%} = 830)$$

is thus obtained; from this concentrate the crystallized diacetate of melting point 59° C. may easily be prepared, even without chromatography.

Example 5

10 parts by weight of isophytol in 10 parts by volume of dioxane are added while stirring, in the course of 15 minutes and at 50° C., to a solution of 11 parts by weight of 2-methyl-1,4-naphthohydroquinone and 1.5 parts by volume of boron trifluoride etherate in 30 parts by volume of dioxane. Thereupon, stirring is continued for 20 minutes at 50° C., and the condensation product formed is purified and oxidized as described in Example 1. There are obtained 5.7–6.2 parts by weight of racemic 2-methyl-3-phytyl-1,4-naphthoquinone (vitamin K₁ racemate) in the form of a golden yellow oil of $n_D^{20}$=1.527. The ultraviolet spectrum in petroleum ether solution shows peaks at 243, 249, 261, 270 and 325 mµ

($E_{1\,cm.}^{1\%}$ = 398, 417, 395, 394, 70.7)

With respect to isophytol, the yield amounts to about 40%. The yield is approximately the same, when the condensation with isophytol is carried out at 100° C. However, the yield is small when the condensation is carried out at 20° C. (dioxane as solvent) and at 150° C. (acetylglycol-monomethylether as solvent).

In contradistinction to the natural vitamin K₁, the racemate obtained as above from isophytol and 2-methyl-1,4-naphthohydroquinone did not yield any crystallized dihydrovitamine K₁ diacetate, upon reduction with simultaneous acetylation.

Example 6

20 parts by weigh of isophytylacetate (prepared from isophytol and acetyl chloride in pyridine solution; boiling point 128° C./0.1 mm., $n_D^{25}$=1.454) are dissolved in 20 parts by volume of dioxane and added at 50° C., while stirring, to a solution of 20 parts by weight of 2-methyl-1,4-naphthohydroquinone and 4 parts by volume of boron trifluoride etherate in 80 parts by volume of dioxane. The mixture is stirred for 30 minutes at 50° C. and worked up as described in Example 2. There are obtained 28 parts by weight of a crude condensation product of $n_D^{25}=1.512$ and 30 parts by weight of a concentrate containing about 50% of 2-methyl-3-phytyl-1,4-naphthohydroquinone diacetate. $n_D^{25}=1.506$; ultraviolet maximum in petroleum ether at 230 mμ:

$$E_{1cm.}^{1\%}=850)$$

The purification of the noncrystallizing diacetate may be achieved as described in Example 2 by chromatography on aluminum oxide or as described in Examples 1 and 5 by purification in the form of 2-methyl-3-phytyl-1,4-naphthohydroquinone and subsequent acetylation. The pure racemate of 2-methyl-3-phytyl-1,4-naphthohydroquinone diacetate is a very viscous oil; $n_D^{20}=1.523$; ultraviolet maximum in ethanol at 230 mμ and 286 mμ

$$(E_{1cm.}^{1\%}=1600 \text{ and } 112)$$

Example 7

To a solution of 5 parts by weight of 2-methyl-1,4-naphthohydroquinone in 20 parts by volume of dioxane is added 1 part by volume of anisol saturated with boron trifluoride and the mixture is heated to 50° C. While stirring and introducing nitrogen, a solution of 5 parts by weight of phytol in 5 parts by volume of dioxane are added. Stirring is continued for 30 minutes at 50° C. The condensation product formed is worked up as described in Example 2. There are obtained 6.8 parts by weight of a crude condensation product of $n_D^{20}=1.509$, from which 7 parts by weight of a 45% concentrate of 2-methyl-3-phytyl-1,4-naphthohydroquinone diacetate may be prepared. (Ultraviolet maximum in petroleum ether at 230 mμ:

$$E_{1cm.}^{1\%}=720)$$

By chromatography and crystallisation in accordance with Example 2 the pure dihydrovitamin K₁ diacetate of melting point 59° C., may be isolated therefrom in a good yield.

Example 8

To a solution of 10 parts by weight of 2-methyl-1,4-naphthohydroquinone in 40 parts by volume of dioxane are added 10 parts by volume of dioxane in which was previously introduced 1 part by weight of gaseous boron trifluoride. 10 parts by weight of isophytol in 10 parts by volume of dioxane are added at 50° C. and the mixture is stirred for 30 minutes at 50° C. Working up is effected as described in Example 1. There is obtained a good yield of racemic 2-methyl-3-phytyl-1,4-naphthohydroquinone as a golden yellow oil, which corresponds in all its properties with the product of Example 5.

We claim:

1. A process which comprises condensing 2-methyl-1,4-naphthohydroquinone with a compound selected from the group consisting of phytol, isophytol, phytyl esters, isophytyl esters and phytyl ethers in the presence of a boron trifluoride catalyst.

2. The process of claim 1, wherein the reaction is carried out at a temperature between 30 and 120° C.

3. The process of claim 1, wherein the catalyst is boron trifluoride etherate and the reaction is carried out at a temperature between 40 and 70° C.

4. A process which comprises condensing 2-methyl-1,4-naphthohydroquinone with isophytol in the presence of a boron trifluoride catalyst.

5. The process of claim 4, wherein the catalyst is boron trifluoride etherate and the reaction is carried out at a temperature between 40 and and 70° C.

UNITED STATES PATENTS

| Number | Name | Date |
| --- | --- | --- |
| 2,325,681 | Isler | Aug. 3, 1943 |
| 2,348,037 | Thayer | May 2, 1944 |
| 2,351,347 | Luten | June 13, 1944 |
| 2,445,735 | Kitchen | July 20, 1948 |